(12) United States Patent
Freund et al.

(10) Patent No.: US 8,864,154 B2
(45) Date of Patent: Oct. 21, 2014

(54) ACTUATOR THAT CAN BE DECOUPLED, IN PARTICULAR HAVING AN ELECTROMECHANICAL DRIVE

(75) Inventors: Wolfgang Freund, Langenbernsdorf (DE); Andreas Kissler, Crimmitschau (DE); Tino Schmidt, Muehlsen (DE); Matthias Maier, Greiz (DE); Juergen Schulze, Chemnitz (DE)

(73) Assignee: Asturia Automotive Systems AG, Munich (DE)

( * ) Notice: Subject to any disclaimer, the term of this patent is extended or adjusted under 35 U.S.C. 154(b) by 50 days.

(21) Appl. No.: 13/820,889

(22) PCT Filed: Sep. 5, 2011

(86) PCT No.: PCT/DE2011/075210
§ 371 (c)(1),
(2), (4) Date: Jun. 19, 2013

(87) PCT Pub. No.: WO2012/048694
PCT Pub. Date: Apr. 19, 2012

(65) Prior Publication Data
US 2013/0291664 A1 Nov. 7, 2013

(30) Foreign Application Priority Data
Sep. 6, 2010 (DE) .................... 20 2010 008 467 U

(51) Int. Cl.
*B60G 21/055* (2006.01)
*F16H 19/08* (2006.01)
*F16H 1/32* (2006.01)

(52) U.S. Cl.
CPC .......... *F16H 19/08* (2013.01); *B60G 2202/135* (2013.01); *F16H 1/32* (2013.01); *B60G 2206/427* (2013.01); *B60G 21/0555* (2013.01); *B60G 2204/4191* (2013.01); *B60G 2600/22* (2013.01); *B60G 2202/42* (2013.01); *B60G 21/0556* (2013.01)
USPC .................. 280/124.106; 280/5.511; 267/188

(58) Field of Classification Search
USPC ......... 280/124.106, 5.511, 124.107, 124.149, 280/124.152, 5.506; 267/188, 273, 277
See application file for complete search history.

(56) References Cited

U.S. PATENT DOCUMENTS 6,126,566 A * 10/2000 Kerr .............................. 475/173
6,149,166 A * 11/2000 Struss et al. ............... 280/5.511
(Continued)

FOREIGN PATENT DOCUMENTS

DE         197 14 565 A1     1/1998
DE     10 2008 018 610 A1   10/2008
(Continued)

OTHER PUBLICATIONS

International Search Report dated Feb. 24, 2012 including English language translation (Six (6) pages).

*Primary Examiner* — Drew Brown
(74) *Attorney, Agent, or Firm* — Crowell & Moring LLP

(57) ABSTRACT

An actuator having an electromechanical drive and a housing is provided. The driving torque provided by an electric motor is transmitted by gear train to two actuator outputs connected to two parts of a stabilizer. The gear train is an eccentric gear train, the drive shaft of which is driven by the electric motor. An overall eccentric driven by the drive shaft has on its circumference a drive gear having a first outer profile and a second outer profile different therefrom. In the operating state the drive gear first outer profile is connected to a first inner profile of a first one of the outputs and the drive gear second outer profile is connected to a second inner profile of the second one of the outputs, and the connection can be eliminated by changing the eccentricity of the eccentric such that both outputs can rotate freely relative to each other.

10 Claims, 7 Drawing Sheets

(56) References Cited

U.S. PATENT DOCUMENTS

| | | | |
|---|---|---|---|
| 6,550,788 B2 * | 4/2003 | Schmidt et al. | 280/5.511 |
| 7,588,259 B2 * | 9/2009 | Azekatsu et al. | 280/124.107 |
| 8,109,522 B2 * | 2/2012 | Pinkos et al. | 280/5.511 |
| 2002/0180167 A1 | 12/2002 | Schmidt et al. | |
| 2008/0000710 A1 * | 1/2008 | Vortmeyer et al. | 180/282 |
| 2008/0150241 A1 | 6/2008 | Azekatsu et al. | |
| 2011/0190090 A1 | 8/2011 | Freund et al. | |

FOREIGN PATENT DOCUMENTS

| | | |
|---|---|---|
| DE | 10 2008 000 148 A1 | 7/2009 |
| DE | 20 2008 013 633 U1 | 4/2010 |
| EP | 1 821 390 A2 | 8/2007 |
| EP | 2 068 037 A1 | 6/2009 |
| JP | 60-234171 A | 11/1985 |
| JP | 2010-234947 A | 10/2010 |
| WO | WO 01/51301 A1 | 7/2001 |

* cited by examiner

ACTUATOR THAT CAN BE DECOUPLED, IN PARTICULAR HAVING AN ELECTROMECHANICAL DRIVE

CROSS REFERENCE TO RELATED APPLICATIONS

This application claims priority of PCT International Application No. PCT/DE2011/075210, filed Sep. 5, 2011, which claims priority under 35 U.S.C. §119 from German Patent Application No. 20 2010 008 467.9, filed Sep. 6, 2010, the entire disclosures of which are herein expressly incorporated by reference.

BACKGROUND AND SUMMARY OF THE INVENTION

The invention relates to an actuator, in particular, with an electromechanical drive, and is used, in particular, in a stabilizer for equalizing vehicle movements.

European patent document no. EP 1 821 390 A2 discloses an electric drive for an adjustable stabilizer, and this electric drive comprises a housing, in which a stator is rigidly mounted, and coaxially thereto a rotator and an electronic unit are arranged for the purpose of operating the electric drive. A conducting wire runs out from the stator through a cover of the housing and is formed by at least one fixed bolt element.

German patent document no. DE 10 2008 000 148 A1 proposes a system, comprising at least one electromechanical stabilizer, a rotational speed sensor and/or a rotational angle sensor arrangement and an electrical connection technique. This system has a one-piece housing, in which the electric motor for operating the at least one electromechanical stabilizer is arranged. An add-on component is attached to the stabilizer. In this case the add-on component has a sensor cable harness with an integrated high current cable and a module, which comprises a least one measuring sensor for detecting a rotor bearing of the electric motor or more specifically a rotational angle sensor and/or a rotational speed sensor. The module also comprises the electrical assembly and connection technique for making contact with the connecting cables of the electric motor.

An actuation of the actuator is not provided in the aforementioned solutions. However, such an actuation is useful when the road lane is uneven, so that it would be possible to compress each wheel independently as a function of the unevenness of the road lane in order to be able to achieve high driving comfort with a suitable adjustment of the wheel suspension.

German patent document no. DE 19714565 A1 discloses a stabilizer arrangement that comprises a stabilizer, which is operatively connected to a vehicle body and the wheel control parts, and an actuator, which can be driven by an electric motor and which can provide a torsional moment of the stabilizer that counteracts a rolling moment. In this case a longitudinally adjustable telescopic unit is provided as the actuator; and this telescopic unit comprises a telescopic cylinder for accommodating at least the electric motor and a piston head, which can be arrested in the adjustment mode by a blocking device. In this case a translatory movement of a piston rod, which is axially supported by the head on the piston, can be introduced by way of a gear train by actuating the electric motor; and the result of this translatory movement is a change in the length of the telescopic unit. The telescopic unit comprises the piston head and the piston rod. The piston rod can be arrested in the telescopic cylinder by a blocking device. There is the possibility of actuating the actuator in that in the de-energized state of the actuator the piston is freely movable in the telescopic cylinder. This actuator that can be actuated in the de-energized state has a complicated design configuration and large dimensions.

Japanese patent document no. JP 60-234 171 A describes a design variant for adjusting the tooth flank backlash of two meshing gearwheels. To this end an eccentric axle and an eccentric cylinder rotate about an axial center of the drive axle, so that the gearwheels are always in engagement.

A decoupling of the drive shaft and the output shaft is neither provided nor suggested by this solution.

The object of the present invention is to develop an actuator, in particular having an electromechanical drive, and exhibiting a simple design configuration and an actuation for decoupling the stabilizer halves.

The actuator comprises, in particular, an electromechanical drive and a housing, wherein the driving torque provided by an electric motor is transmitted by a gear train to between two outputs of the actuator that are connected to the two halves of a stabilizer, and the gear train is designed in the form of an eccentric gear train, and the drive shaft of said gear train can be driven with the electric motor, wherein an overall eccentric, on the circumference of which a drive gear having a first outer profile and a second outer profile, which is different from said first outer profile, is arranged, can be driven by the drive shaft; wherein in the operating state of the actuator the axis of the drive gear is arranged in an eccentric manner with respect to the axes of the outputs by the overall eccentric; and, as a result, the first outer profile of the drive gear is operatively connected to an inner profile of a first output; and the second outer profile is operatively connected to a second inner profile of the second output; and that this operative connection can be cancelled by changing the eccentricity of the eccentric; and, thus, both outputs can be rotated freely relative to each other (release).

To this end, the overall eccentric is divided into a drive eccentric, which is connected to the drive shaft, and an eccentric bushing, which is arranged between the drive eccentric and the drive gear, in such a way that during a relative rotation between the drive eccentric and the eccentric bushing, the axis of the drive gear can be adjusted in such a way that it is more or less in alignment with the longitudinal axis of the actuator; and in this position the outer profiles of the drive gear are not operatively connected to the inner profiles of the first and second output.

At least one locking element is provided between the drive eccentric and the eccentric bushing. In the operating state, in which a torque is transmitted to the two outputs, this locking element fixes said drive eccentric and said eccentric bushing with respect to each other in such a way that their eccentricity in a first position adds up; and, thus, the axis of the drive gear lies eccentrically to the axis of the outputs, so that the operative connection to the drives is established and that the locking element for putting into effect the freewheeling releases the connection between the drive eccentric and the eccentric bushing, so that the drive eccentric and the eccentric bushing rotate relative to each other until in a second position their eccentricity is essentially eliminated, so that the axis of the drive gear is placed in essence centrally in relation to the outputs, and the operative connection of the drive gear to the outputs is cancelled. In this second position the drive eccentric and the eccentric bushing are also fixed in position relative to each other preferably by the locking element.

The relative rotation between the drive eccentric and the eccentric bushing in order to change over from the operating state (first position) into the freewheeling state (second position) amounts in essence to 180°. The locking element is preferably magnetically actuable.

This possibility of changing the eccentric position of the drive gear makes it possible to switch easily and quickly from the transmission mode into the freewheeling mode.

A release of both outputs of the actuator is particularly necessary for safety in the event of a power failure and in order to enhance the driving comfort when driving straight ahead in that the copying of the wheel movements is avoided.

Rolling bodies, which transmit the torque, are arranged in an advantageous manner between the outer profiles of the drive gear and the inner profiles of the outputs.

The use of rolling bodies effects in the eccentric gear train a larger force-transmitting surface than is the case with gear teeth that are used in the conventional way, so that it is possible to build smaller and to transmit higher moments and still maintain the same size.

Furthermore, the use of rolling bodies arranged between the profiles makes it possible to achieve a reduction in the friction and the wear, so that the actuator has a long service life even with rapidly varying loads.

In this context the drive gear of the eccentric gear train has a first outer profile, which interacts with a first inner profile of the first output by first rolling bodies. Furthermore, the drive gear is provided with a second outer profile, which is different from the first outer profile, wherein this second outer profile interacts with a second inner profile of the second output by second rolling bodies. When the drive gear rotates, a relative rotation between the first output and the second output is generated due to the different pairings between a first outer profile/first rolling bodies/first inner profile of the first output, and a second outer profile/second rolling bodies and second inner profile of the second output.

As a result, a torque/torsional moment is transmitted to the ends of the stabilizer, so that these stabilizer ends rotate relative to each other and, as a result, the vehicle movements in turn are balanced, because the stabilizer is connected, on the one hand, to the wheel suspension and, on the other hand, to the chassis/vehicle body.

Preferably the first and the second outer profile exhibit different nominal diameters and/or different profile sizes; and the first and second rolling bodies as well as the first and second internal teeth of the outputs are designed to correspond thereto. Furthermore, in order to ensure a slim type of design, the first outer profile and the second outer profile of the drive gear are arranged one after the other along a longitudinal axis of the actuator.

The rolling bodies are designed, in particular, in the form of rollers. In order to avoid running noises, elements (in particular, elastomer rings) are arranged between the drive gear and the first and second rolling bodies; and these elements transmit a prestress force, which acts radially outwards, to the rollers, so that the first and second rolling bodies are constantly prestressed against the corresponding inner profiles of the internal teeth of the two outputs.

The two ends of the roller-shaped rolling bodies are guided in retaining rings, which also exhibit preferably sound-damping properties. Instead of the aforementioned described rolling body teeth, it is also possible to use any conventional gear teeth.

The first output of the eccentric gear train, which is connected to the first stabilizer half, can be designed either in the form of a rotary shaft in a fixed housing; or as an alternative a first output shaft can be formed by the housing. The second output of the eccentric gear train is designed in the form of a second output shaft that can be mounted in a rotatable manner in the housing.

In order to connect to the first stabilizer half, the first output shaft has a first connecting element on the output side; and the second output shaft is provided in an analogous manner with a second connecting element on the output side; and this second connecting element is connected to the second stabilizer half.

According to the invention, the connection between the first output shaft and the first stabilizer half and/or the connection between the second output shaft and the second stabilizer half is/are provided with an overload protection in the form of a slip clutch, which allows the respective connection to slide through, when a predefined moment is exceeded and to catch again upon undershooting this moment. This arrangement ensures that the actuator and the system are protected against overload. A preferred design alternative is to configure the connection to the stabilizer halves by a longitudinal press fit or a transverse press fit. In this case the region of the connection has a layer, in particular a phosphate layer, which ensures the micropositive lock between the respective output shaft and the stabilizer half and transmits the force lock, generated during the press fit, up to the predetermined moment. If the moment is exceeded, the connection rotates between the at least one stabilizer half and the actuator, until the moment lies again in the allowable range.

A measuring arrangement for detecting the torsion between the first output shaft and the first stabilizer half is arranged in an advantageous way between the first output shaft in the form of the housing and the first stabilizer half. In this case the measuring arrangement is designed, in particular, in the form of a torque sensor, the output of which is coupled with a control logic, which controls the motor torque as a function of the torsional moment. In this context it is possible to return a rotation of the outputs of the actuators that has occurred as a result of the overload back into the desired starting position by a counterclockwise rotation. If the torque sensor no longer detects any torsion, then the stabilizer halves may be found once again in the requisite position with respect to the actuator.

The solution according to the invention provides an actuator of a new generation, which provides a larger actuator moment with smaller dimensions than could be achieved to date with conventional types of designs, has a protection against overload and comprises an actuation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
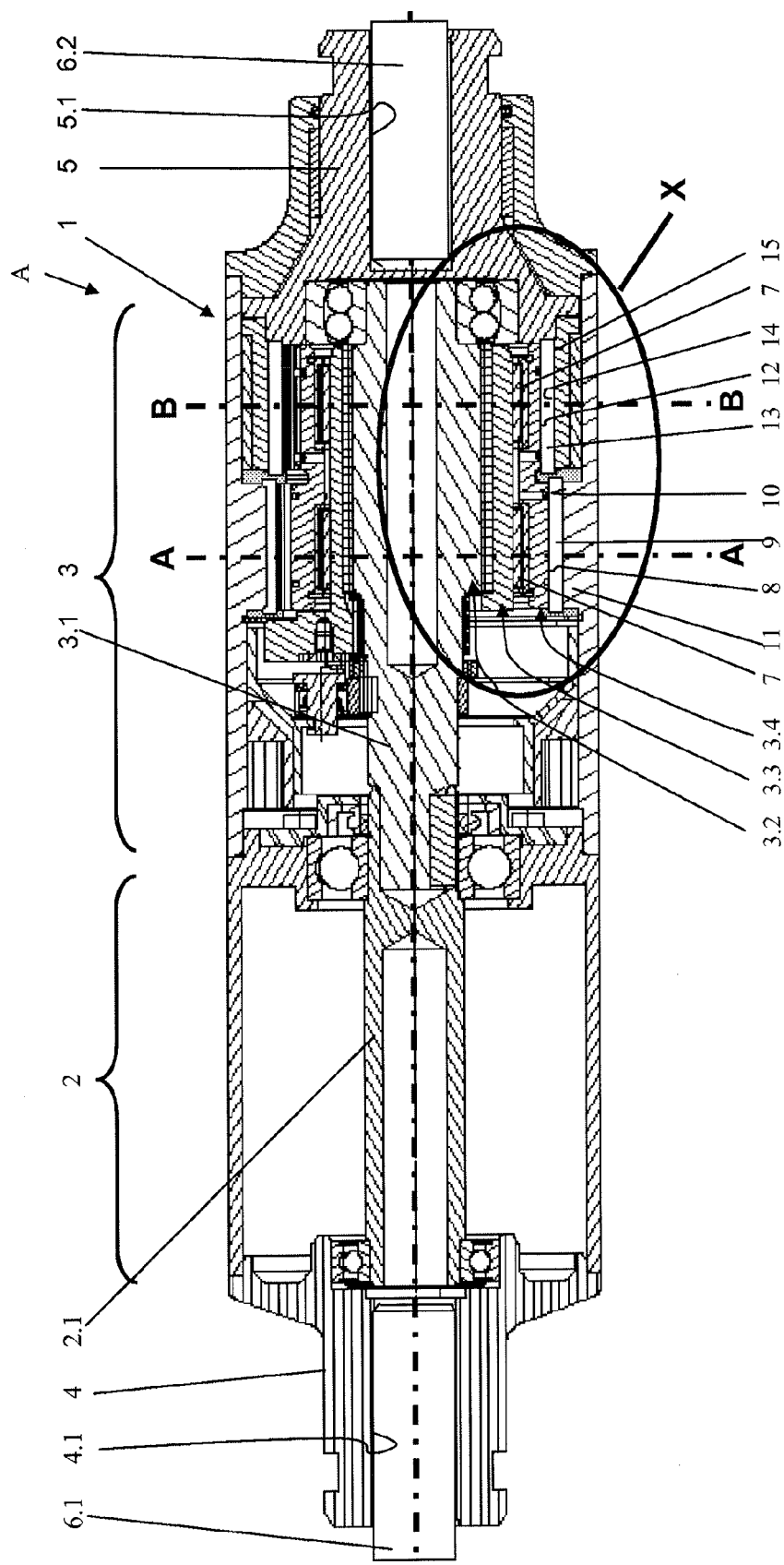
FIG. 1 is a longitudinal sectional view of an actuator A.

FIG. 1 is a longitudinal sectional view of an actuator A, which is constructed in a rotationally symmetrical manner and has a housing 1, in which an electric motor 2 (not shown in detail) and a gear train 3 are arranged axially one after the other. On the side of the electric motor 2 the actuator A has on the output side a first output shaft 4, which is securely connected to the housing 1. On the opposite side a second output shaft 5 is provided on the output side. The housing 1 and, thus, the first output shaft 4, on the one hand, and the second output shaft 5, on the other hand, can be rotated in relation to each other, when the electric motor 2 and the gear train 3 are actuated. The first output shaft 4 is designed at the end in the form of a hollow shaft butt and is provided with a drilled hole 4.1, in which a first end 6.1 of a first half of a stabilizer (not depicted) sits. The second output shaft 5 is also designed in the form of a hollow shaft butt on the outwards facing end of the of the second output shaft and is provided with a drilled hole 5.1, in which a second end 6.2 of the second half of the stabilizer (not depicted) is arranged. In this case the ends 6.1, 6.2 are fastened in the drilled holes 4.1, 5.1 by a longitudinal press fit. At the same time either the ends 6.1, 6.2 or the drilled holes 4.1, 5.1 are provided with a coating, in particular, a phosphate layer, which guarantees the micropositive lock between the respective output shaft 4, 5 and the ends 6.1, 6.2 of the stabilizer halves and transmits the force lock, acting through the press fit, only up to the predetermined moment, thereby forming an overload protection, which releases the respective connection when a predetermined moment is exceeded and upon undershooting this moment closes the respective connection. With this arrangement a safety during overload is guaranteed.

The shaft 2.1 of the electric motor 2 is connected to the drive shaft 3.1 of the gear train 3, which is formed as an eccentric gear train. Mounted on the drive shaft 3.1 is the drive eccentric 3.2, which in this case is constructed in one piece with the drive shaft 3.1. An eccentric bushing 3.3 sits on the drive eccentric 3.2; and a drive gear 3.4 can be driven by this eccentric bushing.

Figure 2:
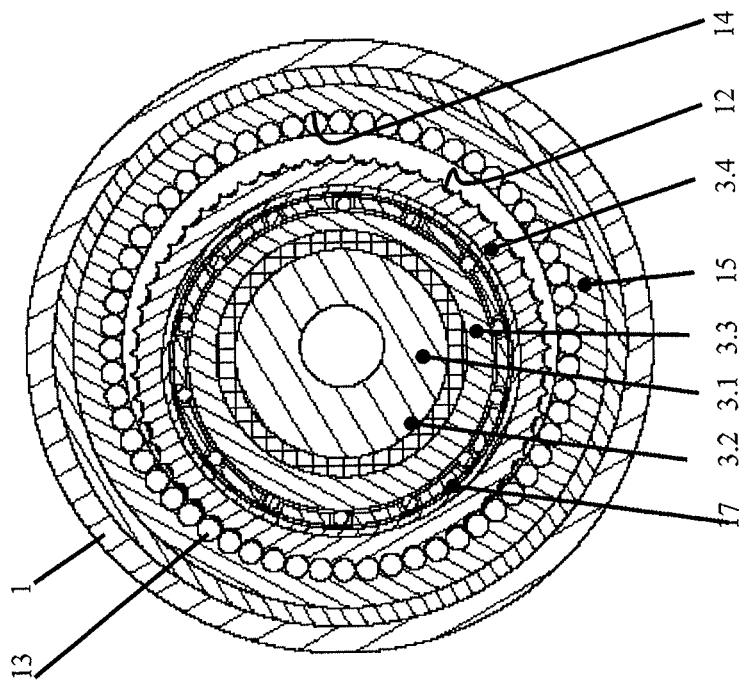
FIG. 2 is a sectional view A-A according to FIG. 1.

A first outer profile 8 of the drive gear 3.4 corresponds over first rolling bodies 9 with an inner profile 10 of the first output 11, which is formed internally on the housing 1, as a result of which a rotational motion can be transmitted to the first drive shaft 4 by way of the housing 1 (see also FIG. 2).

The second outer profile 12 of the drive gear 3.4 is constructed differently (smaller diameter, fewer profile elements) from the first outer profile 8 of the drive gear 3.4 and is axially offset. In this case the second outer profile 12 corresponds over second rolling bodies 13 with a second inner profile 14 of the second output 15 (see also FIG. 3). The second output 15 is securely connected to the second output shaft 5, so that a rotational motion can be transmitted to the second output shaft 5.

Since the first gear pairing:
first outer profile 8 of the drive gear 3.4/first rolling bodies 9/first internal teeth 10 of the first output 11 (=first output shaft 4)
and the second gear pairing:
second external teeth 12 of the drive gear 3.4/second rolling bodies 13/second internal teeth 14 of the second output 15 (=second output shaft 6) are dimensioned in different ways, a relative rotational motion is generated between the first output shaft 4 and the second output shaft 5. When the gear train 3 is actuated by the motor 2 and when the eccentricity of the drive eccentric 3.2 and the eccentric bushing 3.3 adds up, then and only then is the drive gear 3.4 mounted eccentrically in relation to the outputs 11 and 15 and meshes, as can be seen in FIGS. 1 to 4, with the rolling bodies 9 and 13 in this first position.

The rolling bodies 9, 13 are designed in the form of rollers and are accommodated in retaining rings 17 (see FIG. 4) at the end. These retaining rings perform an axial fixing. The first and the second outer profiles 8, 12 of the drive gear 3.4 and the first and second inner profiles 10, 14 are adapted to the diameter of the rolling bodies 9, 13 and are formed in essence by recesses, which resemble segments of a circle and extend in the longitudinal direction.

Figure 3:
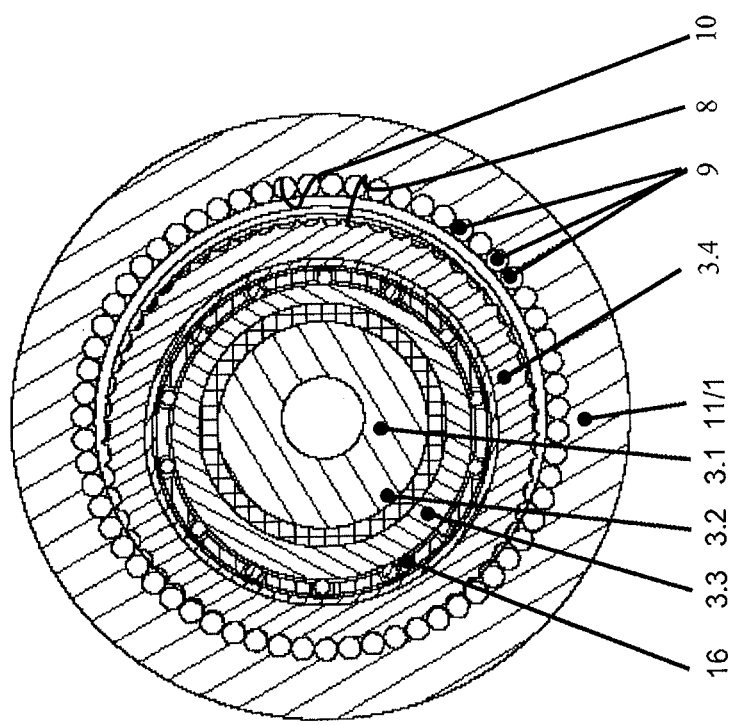
FIG. 3 is a sectional view B-B according to FIG. 1.
Figure 4:
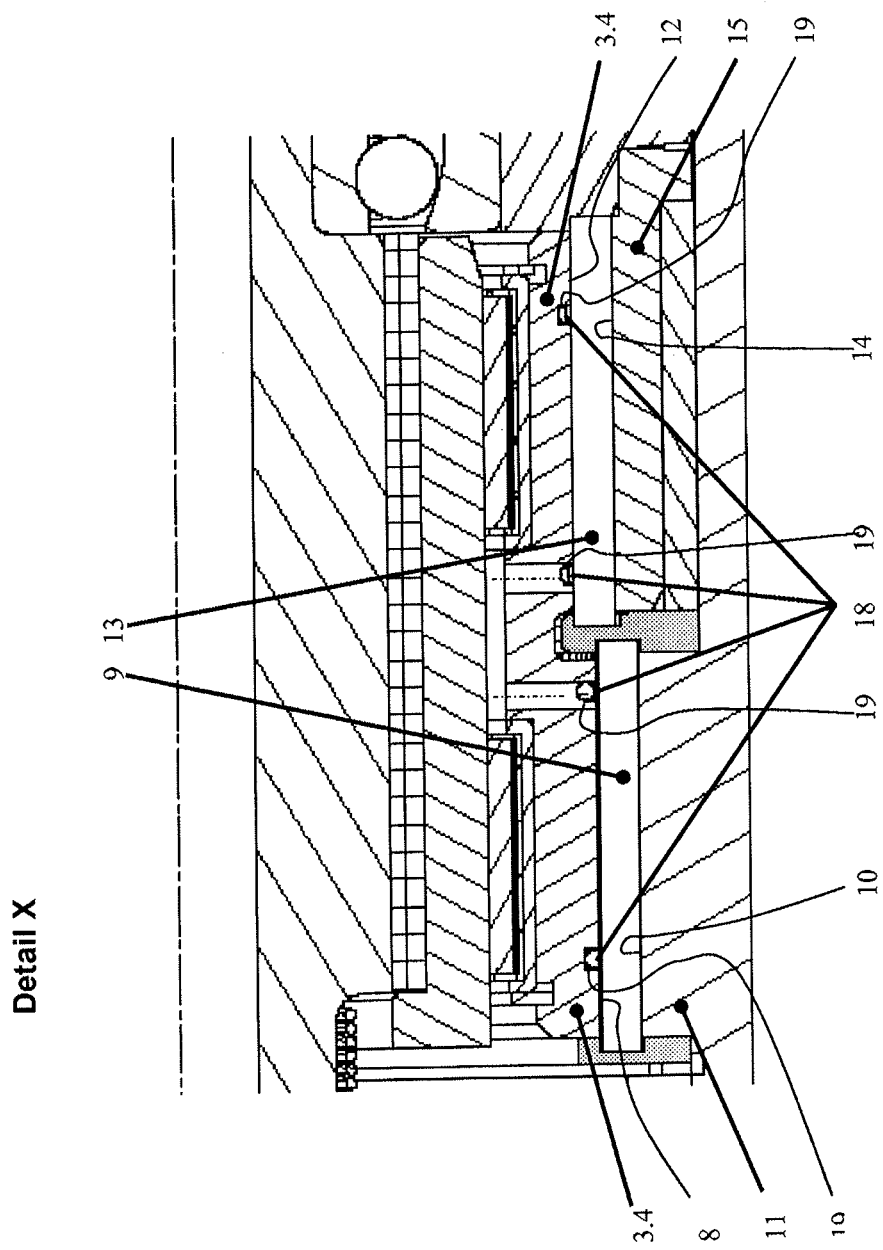
FIG. 4 shows a detail X according to FIG. 1.

FIGS. 2, 3 and 4 show that two bearings 16, 17, which are arranged one after the other in the longitudinal direction, are arranged between the eccentric bushing 3.3 and the drive gear 3.4. These two bearings enable a relative rotation between the eccentric bushing 3.3 and the drive gear 3.4. Furthermore, it is apparent from the drawing 4 that two axially spaced elastomer rings 18 are arranged in the region of the first outer profile 8 and in the region of the second outer profile 12 of the drive gear 3.4. These two axially spaced elastomer rings sit on the periphery in the recesses 19 of the drive gear 3.4 and transmit a radially outwards acting prestress force to the roller-shaped rolling bodies 9, 13. As a result, the noise level is reduced to a minimum when the gear pairs roll.

Another advantageous embodiment of the actuator consists of the fact that the connection between the first outer profile 8 and the second outer profile 12 of the drive gear 3.4, on the one hand, as well as the first and the second inner profile 10, 14 of the first and second output 11, 15, on the other hand, can be separated in a second position in such a way that both outputs 11, 15 and, thus, both outputs shafts 4, 5 can be freely rotated relative to each other in that the positive locking connection between the drive gear 3.4 and the first and second rolling bodies 9, 13 is released, so that an "actuation" of the actuator A is practically guaranteed.

Figure 5:
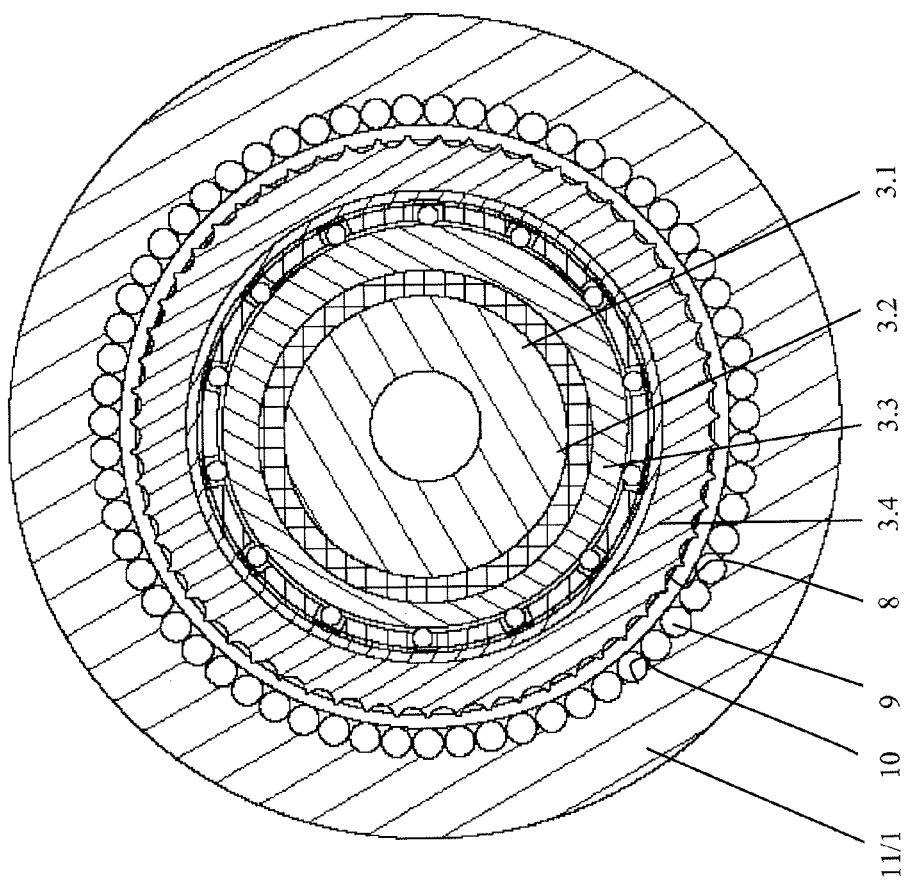
FIG. 5 is a sectional view B-B through the actuated actuator A.
Figure 6:
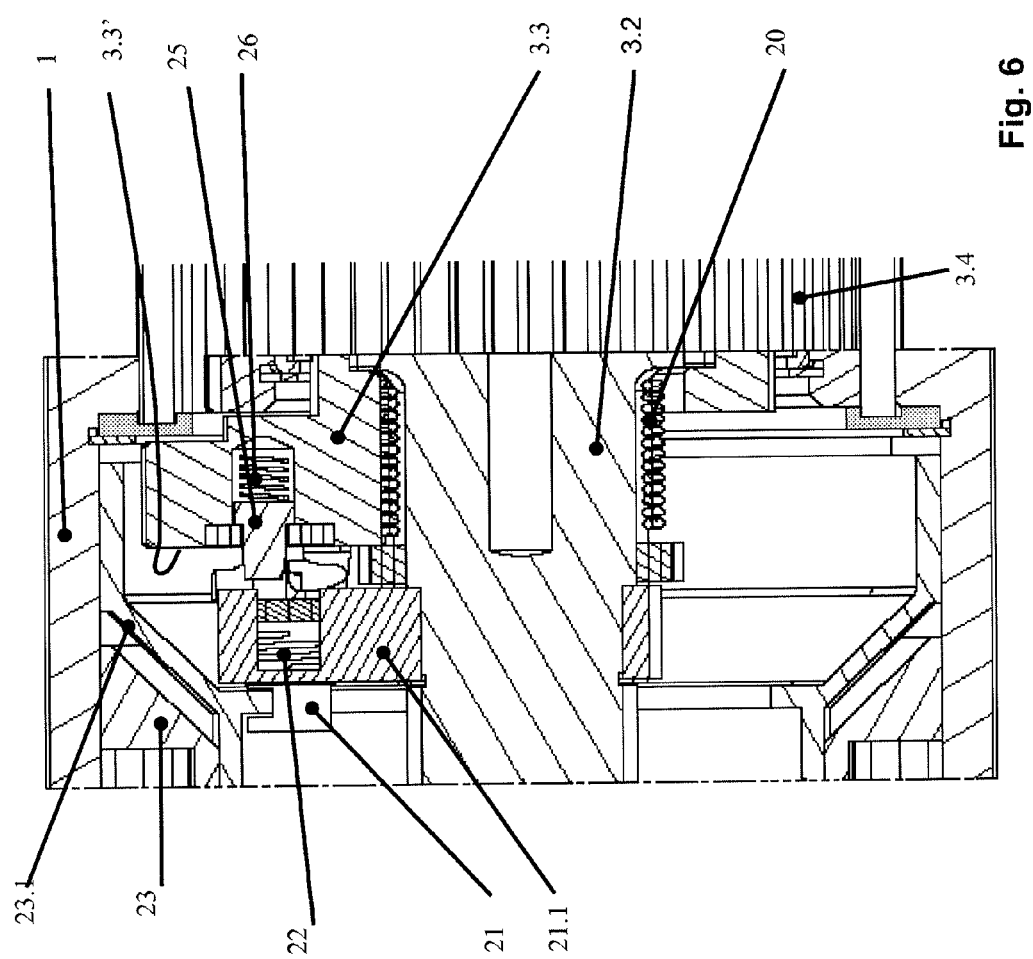
FIG. 6 shows the representation of the longitudinal sectional view in the region of a first variant of the locking between the drive eccentric and the eccentric bushing.
Figure 8:
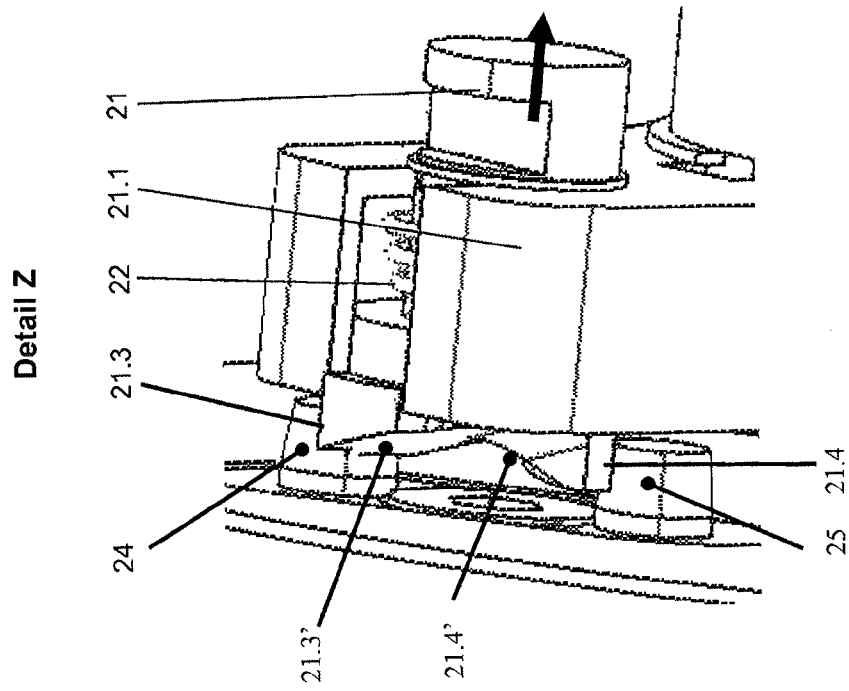
FIG. 8 shows a detail Z according to FIG. 7.
Figure 7:
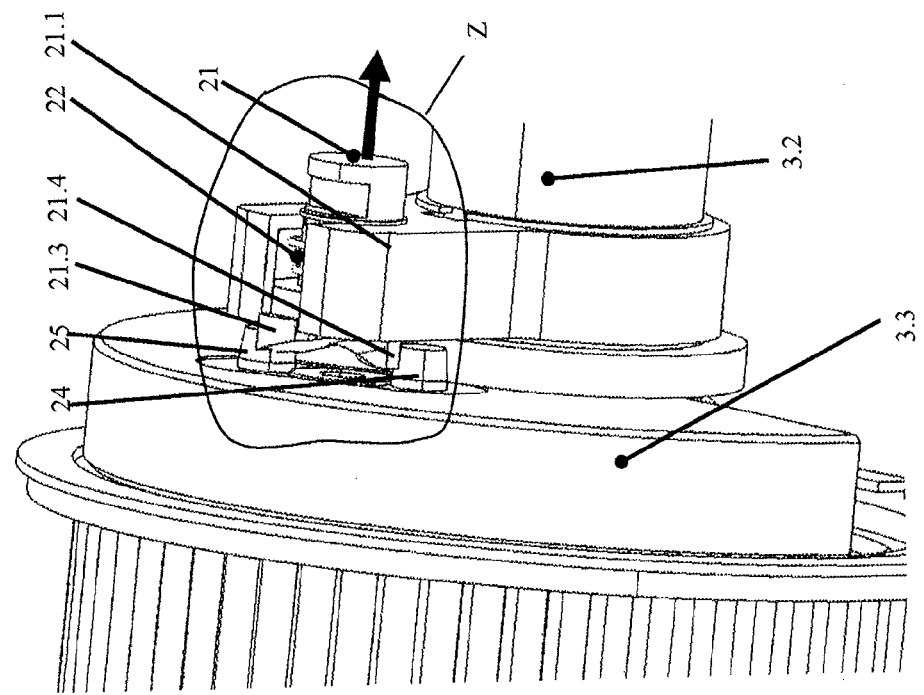
FIG. 7 is a three dimensional representation according to FIG. 6.

If a relative rotation between the drive eccentric 3.2 and the eccentric bushing 3.3 takes place about approximately 180° (see FIG. 5), then their eccentricity is practically eliminated, so that the first outer profile 8 and the second outer profile 12 of the drive gear 3.4 lie more or less centrally in relation to the inner profiles 10, 14 of the outputs 11, 15 and are no longer in engagement with the first and second rolling bodies 9, 13 (rollers).

As a result, the first output shaft 4 and the second output shaft 5 can freely rotate relative to each other. At the same time the actuator is de-energized (fail-safe state).

If the drive eccentric 3.2 and the eccentric bushing 3.3 are rotated again into the first position so that their eccentricity adds up, then the drive gear 3.4, which is mounted on the eccentric bushing 3.3, is displaced again in an eccentric fashion, so that its outer profiles 10, 14 are brought into engagement again with the rolling bodies; and a torque is transmitted to the outputs 11, 15, thereby generating a relative rotation between the first output shaft 4 and the second output shaft 5. Owing to the different relative rotational movements of the output shafts 4, 5, the stabilizer halves, the ends 6.1, 6.2 of which are connected to the output shafts 4, 5, rotate relative to each other. Since the stabilizer is fastened, on the one hand, to the vehicle and, on the other hand, to the chassis/to the vehicle body (not illustrated), the vehicle movements can be balanced by the relative rotation of both stabilizer halves. To this end the actuator has control electronics, which is connected to the on-board electronics/motor electronics of the vehicle.

As an alternative, it is also possible that the first outer profile 8 of the drive gear 3.4 corresponds directly with the first internal teeth 10 of the first output 11 (=first output shaft 4) in the manner of conventional teeth; and the second external teeth 12 of the drive gear 3.4 correspond with the second internal teeth 14 of the second output 15 (=second output shaft 6), so that there is no need for the rolling bodies 9, 13.

The relative rotation between the drive eccentric 3.2 and the eccentric bushing 3.3 can be generated by an actuating and locking mechanism, with which said drive eccentric and said eccentric bushing can be separated and locked again in the requisite positions, offset at an angle of 180° (in the first position and the second position).

Preferably it occurs by at least one pin, which can be actuated more or less in the axial direction and which fixes the drive eccentric and the eccentric bushing in the two positions in such a way that they cannot rotate in relation to each other.

One possible design variant is shown in FIGS. 4 to 7. In this case the unlocking is done magnetically and with the use of a leg spring 20 (FIG. 6), which sits between the drive eccentric 3.2 and the eccentric bushing 3.3 and transmits a torque to said drive eccentric and said eccentric bushing after the unlocking, so that a relative rotation between the drive shaft 3.2 and the eccentric bushing 3.3 is generated, until the freewheeling position is reached. The unlocking has an axially actuable pin in the form of a cotter pin 21, which is arranged on the drive eccentric 3.2 by a fastening element 21.1 and can be axially actuated, counter to the spring force of a restoring spring 22, by a sliding sleeve 23.1 using a magnet 23. The cotter pin 21 has a first run-up slope 21.3' and a second run-up slope 21.4' in the direction of the face side 3.3' of the eccentric bushing 3.3. A first locking pin 24 and a second locking pin 25 are arranged on the eccentric bushing 3.3 in the region of the face side 3.3' of said eccentric bushing and are axially prestressed in each case by one compression spring 26.

In the illustrated position the locking pins 24, 25 are radially fixed in position on the end stops 21.3 and 21.4 of the cotter pin 21, so that the drive eccentric 3.2 and the eccentric bushing 3.3 may be found in a fixed position, in which their eccentricity adds up. If an actuation is to be put into effect, then the cotter pin 21 is moved axially away from the eccentric bushing 3.3 by actuating the magnet 23, so that the locking pins 23, 25 are brought out of disengagement with the stops 21.3, 21.4 of the cotter pin 21. Owing to the action of the leg spring 20, the eccentric bushing 3.3 turns now on the drive eccentric 3.2 until (if desired, also against a stop that is not depicted) its eccentricity is eliminated, and the operative connection of the drive gear to the outputs (not illustrated) is interrupted. If the operative connection is supposed to be re-established, then the cotter pin 21 is moved again by the restoring spring 22 in the direction of the face side 3.3' of the eccentric bushing 3.3 by switching off the magnet 23. Since the drive eccentric 3.2 and the eccentric shaft 3.3 are rotated again relative to each other when the electric motor is switched on, the locking pins 24, 25 move again into their locking position, formed on the cotter pin 21, after the locking pins have run over the corresponding run-up slopes counter to the spring force of the compression spring 26. The locking position is determined by the stops 21.3 and 21.4; and once again a torque can be transmitted to the outputs or more specifically to the drive shafts.

Figure 9:
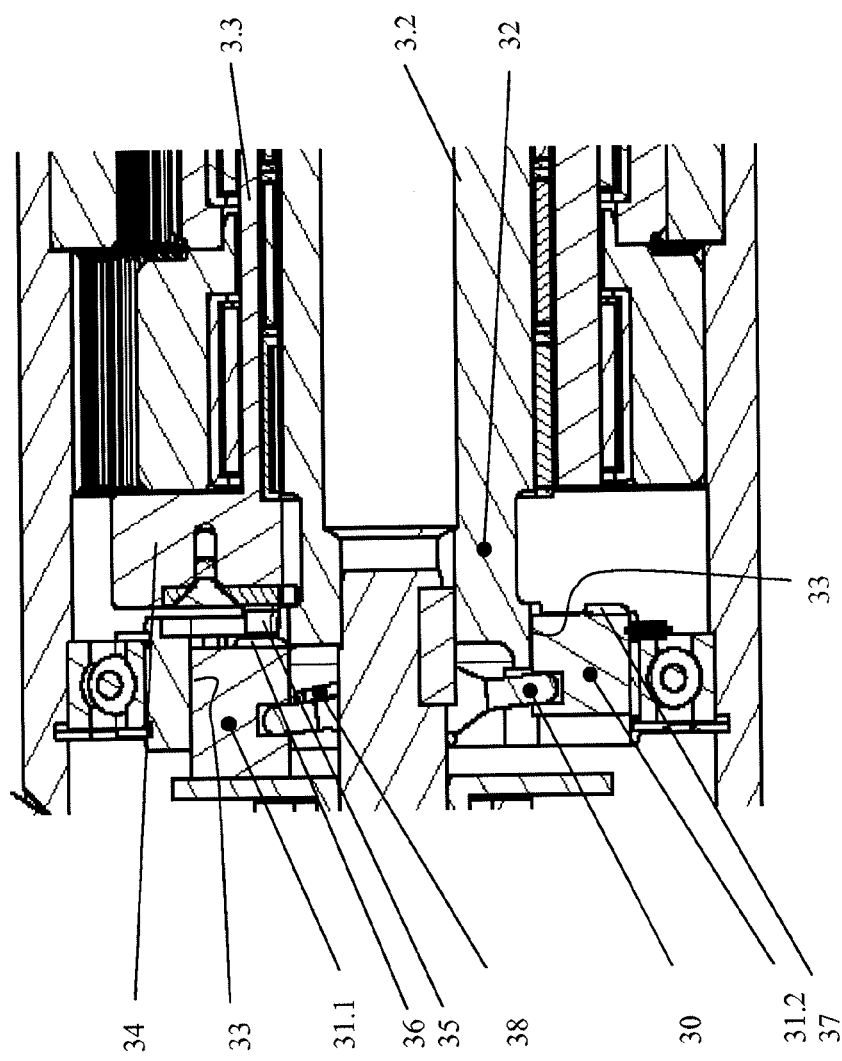
FIG. 9 shows the representation of the longitudinal sectional view of a second variant of the locking between the drive eccentric and the eccentric bushing.

According to FIG. 9, the relative rotation between the drive eccentric 3.2 and the eccentric bushing 3.3 is put into effect by an actuating and locking mechanism, which is configured in the manner of a rocker 30. This rocker 30 is connected in a rotationally rigid manner to the drive eccentric 3.2 and has two axially actuable pins in the form of a first locking pin 31.1 and a second locking pin 31.2. Both locking pins are offset from each other at an angle of 180° and are mounted on the drive shaft or more specifically the drive eccentric in such a way that they can be pivoted, so that when the first locking pin 31.1 performs an axial forward movement, the second locking pin 31.2 performs an axial backward movement by the same amount and vice versa. The axial actuation also takes place by a magnet, which is not shown in FIG. 9. When the magnet is actuated, either the first or the second locking pin 31.1, 31.2 is brought into operative connection or more specifically into engagement with the eccentric bushing 3.3. In FIG. 9 the first locking pin 31.1 has been moved out, and the second locking pin 31.2 has been moved in. The drive eccentric 3.2 has a follower 32 in the direction of the rocker 30. This follower has axial guide bores 33, which are offset by 180° with respect to each other and into which the first and second locking pin 31.1, 31.2 are axially guided. The eccentric bushing 3.3 has a counterweight 34, in which the first and the second pin latch. The counterweight 34 rotates in order to change the operating state by 180° and latches again with the first locking pin 31.1 in the first position, in which the eccentricity of the drive eccentric 3.2 and the eccentric bushing 3.3 adds up; and a torque is generated between the first and the second stabilizer halves; or the counterweight 34 latches with the second locking pin 31.2 in the second position, in which the eccentricity is eliminated, and a free passage between the first and the second stabilizer halves is put into effect. In FIG. 9, the first locking pin 31.1 was moved out of the locking position with the counterweight 34 in this case to the left by the magnet (not illustrated). As a result, an axial projection 35 of the counterweight 34 is brought out of engagement with a corresponding recess 36 of the first locking pin 31.1. At this point the eccentric bushing 3.3 can rotate relative to the drive eccentric 3.2 by 180°, so that the projection 35 of the counterweight 34 extends into the recess 37 of the second locking pin 31.2. The axial movement of the rocker 30 against the direction of force of the magnet is put into effect by a restoring spring 38.

In addition to the two aforementioned exemplary embodiments for locking and unlocking the drive eccentric and the eccentric bushing, other design variants are also possible.

In order to measure the torsion, a suitable measuring arrangement is provided in an advantageous way. This measuring arrangement is coupled with a control logic that controls the motor torque as a function of the torsional moment. To this end, a measuring arrangement for detecting the torsion between a first output shaft 4 and a first stabilizer half 6.1 is arranged (not illustrated), for example, between the first output shaft 4 in the form of a housing 1 and the first end 6.1 of the first stabilizer half. In this case the measuring arrangement is configured, in particular, in the form of a torque sensor, the output of which is coupled with the control logic. The measuring arrangement can be disposed, for example, in a tubular recess of the housing or more specifically on the face side of the housing.

As an alternative, it is also possible to provide a measuring arrangement that is configured for detecting the torsion and that works on the basis of the inverse magnetostriction. To this end, a region of the stabilizer, which is subject to torsion (for example, the first stabilizer half 6*a*), is provided with a magnetization or rather is magnetized. The region is surrounded by a bushing, in which a coil arrangement is integrated. If the corresponding region of the stabilizer is subject to torsion, then the magnetization changes in the magnetized region due to these mechanical stresses. This state is detected by way of the coil arrangement and is evaluated as a measure for the torsional stress. In this respect it is to great advantage that the forces acting on the shaft (for example, the stabilizer half 6*a*) have an almost linear effect on the magnetic field, as a result of which the measurement of the torsion can be provided with very high accuracy.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An actuator of stabilizer, the actuator having two outputs, comprising:
    an electromechanical drive;
    a housing;
    a gear train having a drive shaft; and
    an electric motor,
    wherein
        the actuator has two outputs, each output being configured to be connected to one of two halves of the stabilizer,
        a driving torque provided by the electric motor is transmitted by the gear train to the two actuator outputs,
        the gear train is an eccentric gear train,
        the drive shaft is arranged to be driven by the electric motor,
        the eccentric gear train includes a drive gear having a first outer profile and a second outer profile which is different from the first outer profile
        the drive gear is configured to be driven by the drive shaft,
        in an operating state of the actuator the first drive gear outer profile is operatively connected to a first inner profile of a first one of the two outputs and the drive gear second outer profile is operatively connected to a second inner profile of a second one of the two outputs, and
        the operative connection can be eliminated by changing an eccentricity of the eccentric such that the two outputs are freely rotatable relative to each other.

2. The actuator claimed in claim 1, wherein
    the gear train includes:
        a drive eccentric connected to the drive shaft, and
        an eccentric bushing arranged between the drive eccentric and the drive gear such that during a relative rotation between the drive eccentric and the eccentric bushing an axis of the drive gear is adjustable to be essentially in alignment with a longitudinal axis of the actuator and the first and second gear drive outer profiles are not operatively connected to the first inner profile of the first output and the second inner profile of the second output.

3. The actuator claimed in claim 2, wherein
    at least one locking element is provided between the drive eccentric and the eccentric bushing, and
    in the operating state the at least one locking element fixes the drive eccentric and the eccentric bushing with respect to each other such that their eccentricity adds up and the axis of the drive gear lies eccentrically to axes of each of the two outputs to establish operative connection to the outputs, and
    the locking element is releasable in order to implement freewheeling of the two outputs by rotating the drive eccentric and the eccentric bushing relative to each other sufficiently to essentially eliminate their eccentricity and thereby place the axis of the drive gear in essence centrally in relation to the outputs such that the operative connection of the drive gear to the two outputs is decoupled.

4. The actuator claimed in claim 3, wherein
the relative rotation between the drive eccentric and the eccentric bushing to change from the operating state into the freewheeling state is approximately 180°.

5. The actuator claimed in claim 4, wherein
the locking element is magnetically actuable.

6. The actuator claimed in claim 1, wherein
a plurality of rolling bodies are arranged between the first and second outer profiles of the drive gear and the first and second inner profiles of the two outputs to at least one of transmit torque and establish the operative connection.

7. The actuator claimed in claim 1, wherein
the drive gear has a first outer profile configured to which interacts with a first inner profile of the first output via first rolling bodies in the form of rollers,
the drive gear has a second outer profile different from the first outer profile, and
the second outer profile interacts with a second inner profile of the second output via second rolling bodies such that during a circumferential rotation of the drive gear a relative rotation is generated between the first output and the second output.

8. The actuator claimed in claim 7, wherein
the first output is connected to a first one of the stabilizer halves,
the first output is a first output shaft configured to be rotatably mounted in the housing or the first output shaft is formed by housing, and
the second output is a second output shaft configured to be rotatably mounted in the housing.

9. The actuator claimed in claim 8, wherein
the first output shaft has a first connecting element on an output side of the first output shaft connected to the first stabilizer half,
the second output shaft has a second connecting element on an output side of the second output shaft connected to the second stabilizer half,
the connection between at least one of the first output shaft and the first stabilizer half and the connection between the second output shaft and the second stabilizer half includes an overload protection slip clutch configured to release at least one of the connections when a predetermined torque is exceeded and to close when the predetermined torque is not exceeded,
at least one of the connections is formed by a longitudinal press fit or a transverse press fit, and
a region of the press fit has a phosphate layer.

10. The actuator claimed in claim 1, further comprising:
a measuring arrangement for detecting a level of torque between the two stabilizer halves; and
a control logic coupled to the measuring arrangement, the control logic being configured to regulate the level of torque between the two stabilizer halves by control of the electric motor.

* * * * *